UNITED STATES PATENT OFFICE.

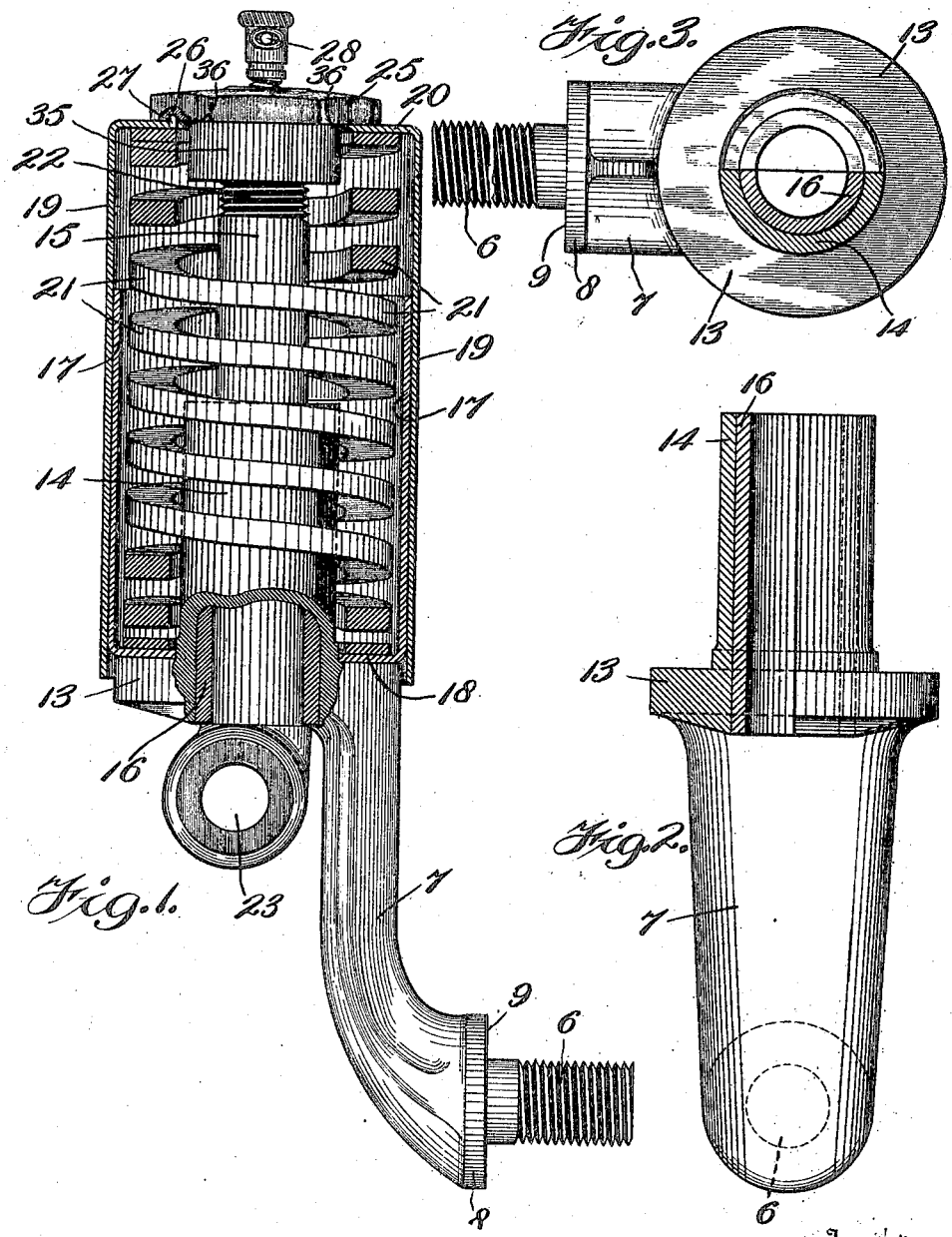

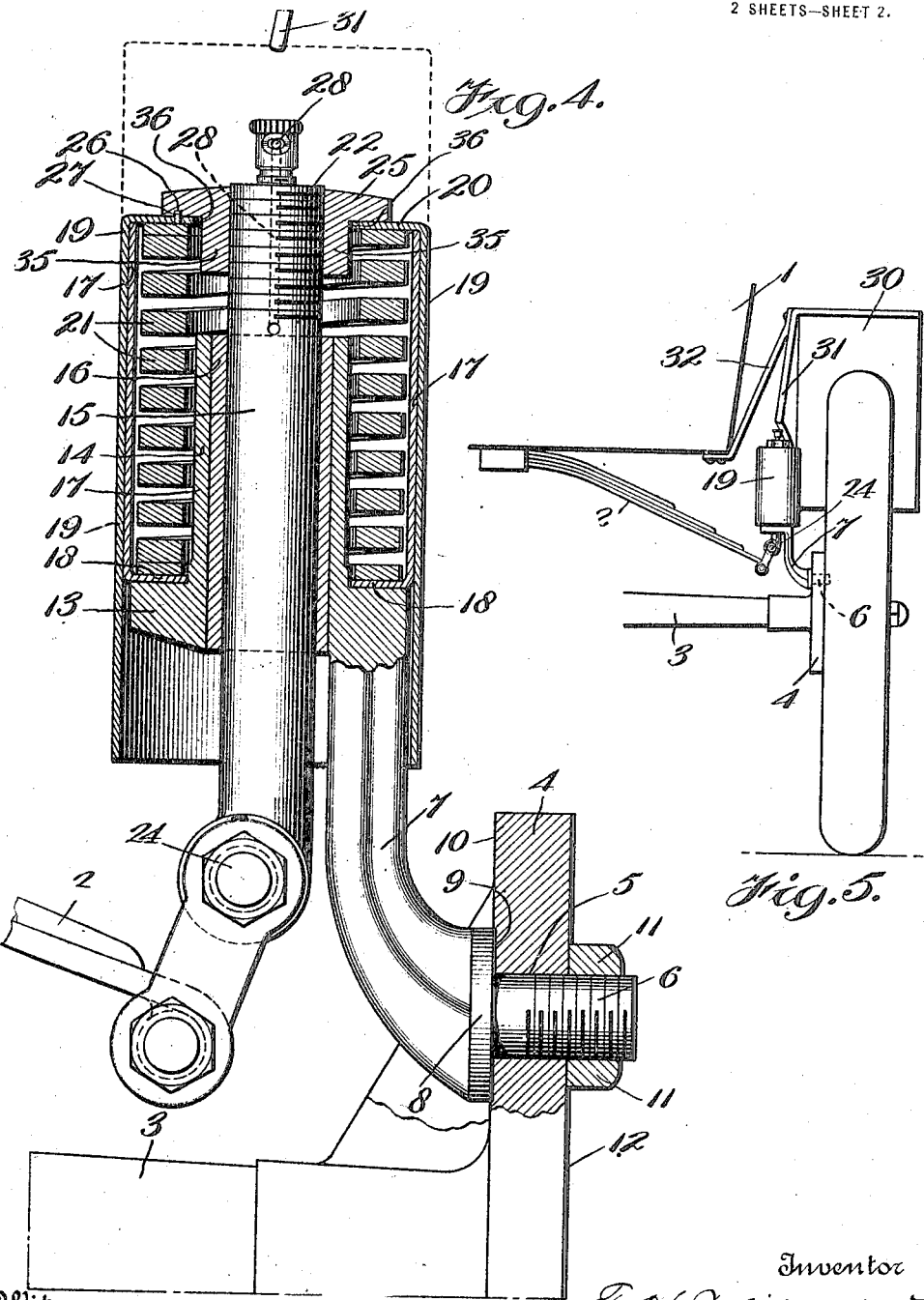

FELIX HENRI PETITMAIRE, OF PHILADELPHIA, PENNSYLVANIA.

TELESCOPING SHOCK-ABSORBER.

1,158,273.

Specification of Letters Patent.

Patented Oct. 26, 1915.

Application filed September 19, 1914. Serial No. 862,532.

*To all whom it may concern:*

Be it known that I, FELIX H. PETITMAIRE, a citizen of the Republic of France, residing at Philadelphia, in the county of Philadelphia and State of Pennsylvania, have invented certain new and useful Improvements in Telescoping Shock-Absorbers; and I do hereby declare the following to be a full, clear, and exact description of the invention, such as will enable others skilled in the art to which it appertains to make and use the same.

This invention relates to improvements in shock absorbers for spring suspended vehicles, and has for its object to provide a device of this character which will be of simple and durable construction, comparatively inexpensive to manufacture and more efficient in action than those heretofore proposed.

With these and other objects in view the invention consists in the novel details of construction and combination of parts more fully hereinafter disclosed and particularly pointed out in the claims.

Referring to the accompanying drawings forming a part of this specification in which like numerals designate like parts in all the views:—

Figure 1 is a central vertical sectional view of a device made in accordance with the present invention, the parts being shown in their normal positions; Fig. 2 is a detail vertical elevational view partly broken away, showing the bracket illustrated in Fig. 1 for attaching the device to the axle flange of the vehicle, together with its bushing; Fig. 3 is a plan view partly in section illustrating the parts shown in Fig. 2; Fig. 4 is a view similar to Fig. 1, the parts being shown in their compressed or lowest positions; and Fig. 5 is a fragmentary elevational view showing the device attached to the rear axle and spring of a well known type of motor vehicle.

1 designates the body of a well known type of vehicle mounted upon the transverse supporting spring 2 and provided with the rear axle or casing 3. Secured to the said casing 3 is a flange 4, provided with an opening 5 through which passes the stud member 6 of a bracket having the reduced portion 7. The said reduced portion 7 of the bracket is provided with an enlarged portion 8 having a face 9 adapted to fit against the face 10 of the flange 4. A nut 11 is threaded upon the stud member 6 and takes against the face 12 of the flange 4, thus rigidly securing the bracket 7 to the said flange. The bracket 7 is further provided at its upper end with a platform or supporting member 13 and projecting upwardly therefrom is the extended boss or sleeve 14, forming a holder for the elongated antifriction lining or bearing 16 for the rod 15.

An inner cylindrical casing member 17 having an inwardly turned flange 18, rests upon the support 13 and surrounds the sleeve 14. Telescoping over the said member 17 is an outer casing or cylinder 19, provided with an inwardly turned flange 20 at its upper end and having its lower end open, as shown. These two telescoping members, 17, and 19, are preferably formed of sheet metal and may fit one another snugly enough to prevent any lateral play, but at the same time permit of free vertical movement.

Mounted within the casing 17 is a spiral spring 21, of sufficient strength to resiliently support the weight of the vehicle body brought thereon. The lower end of this spring 21 rests upon the flange 18 of the casing 17 while its upper end takes against the flange 20 of the casing 19, as will be clear from the drawings.

Slidably mounted within the antifriction bushing 16, is the rod 15, screw threaded on one end as at 22, and provided at its other end with an eye 23 to receive a bolt 24 for the attachment of the spring 2. Screw threaded to the end 22 of the rod 15, is a nut 25, provided with an extension 35. One face of the said nut takes against the flange 20 of casing 19, and forces it down against the tension of the spring 21, while the extension 35 projects through an opening 36 cut in said flange 20. The said nut 25 is provided with a small recess 26 into which fits a pin or lug 27 carried by flange 20 of casing 19, thus locking the said casing and nut together, and enabling one to grasp said casing 19 and turn the nut 25 with an increased leverage to adjust the tension of the spring 21. A passage 28 is also provided in the rod 15 for the feeding of oil to the parts.

In the well known type of car to which this absorber is especially applicable, mud guards such as 30 having downwardly extending portions 31 are provided and are held in place by suitable supports, such as 32. These said supports are fastened to the car body and occupy such a position in relation to the shackle which usually connects the spring 2 with the axle flange 4 that when an ordinary shock absorber is substituted for the said shackle and the car body lurches from side to side, the supports 32 and the depending portion 31 of the mud guard 30 are brought in such proximity to the side or corner and top of the shock absorber casing that contact often occurs. In other words, it results from such construction and the small amount of space available for shock absorbers in this type of car that the absorber casings prior to my invention, are brought into contact with either the supports 32 or the portion 31 of the mud guard 30, or with both and the casing is soon dented or the parts otherwise injured.

In the present invention on the other hand, the casing 19 is made telescopic as will be clear from Fig. 4, is so supported that it maintains always, substantially the same relative position with regard to the mud guard and its support; so that it avoids contact with either. That is to say, with the present invention when the wheel axle flange 4 lifts the reduced portion 7 of the bracket and inner sleeve 14 also lifts, while the outer sleeve 19, carbody, mud guard support 32 and mud guard extension 31, all remain in their former relative positions, so that any contact between said sleeve 19 and carbody or its appendages is avoided in nearly all cases. In the same way when the carbody moves down or sways from side to side, it of necessity carries the spring 2 with it, and said spring of necessity pulls down the sleeve 19 so as to take it out of the paths of the members 31 and 32. This is an important feature of my invention.

Another important feature further resides in the construction by which a long bearing is provided by reason of the casing 19 telescoping over the casing 17, and having a rigid connection with the reciprocating rod 15. That is to say while the extended bearing formed by the extension 14 and lining 16, of course, steadies the up and down movements of said rod 15, and also resists the twisting strains brought on said rod by the similar strains imparted to the spring 2, yet the said lining 16 of necessity wears to a greater or less extent under hard usage, and when this happens, owing to the rigid connections between said rod, the nut 25 and the casing 19, the latter owing to its telescoping action, may greatly assist in steadying the motions of said rod.

In addition to the above, owing to the orifice 36 in the flange 20 of the casing 19 and to the extension 35 of the nut 25 seating in said orifice as well as to the slot 26 and pin 27 securing said nut and flange 20 together, I am not only able to provide a rigid connection between the rod 15 and casing 19, but I also provide an adjustable connection, which enables me by merely grasping the outside of the casing, to turn the nut with a leverage equal to the radius of the casing 19, and to thereby readily adjust the tension of the spring 21. This I regard as another important feature of my invention, for if a given adjustment of the spring 21 is found to enable the mud guard extension 31 or the mud guard support 32 to contact with the casing 19, then, by grasping said casing and turning the same, an adjustment may be had which will avoid such contacts. Further, such an adjustment of the spring may be readily had as will produce the easiest riding.

It is obvious that those skilled in the art may vary the details of construction as well as the arrangement of parts without departing from the spirit of my invention, and therefore I do not wish to be limited to the above disclosure except as may be required by the claims.

What I claim is:—

1. In a shock absorber for an automobile having a car body, an axle, a body supporting spring, and a mud guard support carried by said body, the combination of a bracket provided with means for attachment to said axle and having an extended bearing; an inner casing surrounding said bearing and seated on said bracket; an outer casing telescoping over said inner casing and adapted to reciprocate in proximity to said mud guard support; said bracket also provided with a portion below said extended bearing over which said outer casing is adapted to telescope; a connection between said outer casing and said body spring passing through said extended bearing; and a cushioned connection between said outer and inner casings, substantially as described.

2. In a shock absorber for an automobile comprising a car body, an axle, a body supporting spring, and a mud guard having a support carried by said body, the combination of a casing located in proximity to said mud guard support and having an outer and an inner telescoping member; an absorber spring associated with said telescoping members; a connection between said body spring and the outer telescoping member located in the axis of said casing; and a connection between the axle and the inner telescoping member, comprising a bracket having an extended bearing for said first named connection and a reduced portion below said bearing over which said outer telescoping member reciprocates whereby said outer telescoping member is steadied when caused to move up and down and contact is avoided with said mud guard support, substantially as described.

3. In a shock absorber the combination of a bracket provided with means for attachment to the axle of an automobile and with an extended bearing; an inner casing associated with said bracket; a cushioning spring located in said inner casing; an outer casing telescoping over and adapted to extend beyond said inner casing; a slidable rod passing through said extended bearing on said bracket and adapted to be connected with a vehicle supporting spring; and a connection between said rod and said outer telescoping casing, whereby said outer casing may assist in steadying the up and down motions of said rod in said extended bearing, substantially as described.

4. In a shock absorber the combination of a bracket provided with means for attachment to the axle of an automobile and with an extended bearing having a lining; an inner casing provided with a flange associated with said bracket; a cushioning spring located in said inner casing and resting on said flange; an outer casing telescoping over and adapted to extend beyond said inner casing; a slidable rod passing through said extended bearing on said bracket and adapted to be connected with a vehicle supporting spring; and an adjustable rigid connection between said rod and said outer telescoping casing, whereby said outer casing may assist in steadying the up and down motions of said rod in said extended bearing, substantially as described.

5. In a shock absorber the combination of a bracket provided with an extended sleeve having a lining to constitute an extended bearing, with a shoulder, and with a reduced lower portion having means for attachment to the axle of a vehicle; an inner casing provided with an inwardly extending flange adapted to rest on said shoulder; a cushioning spring adapted to rest on said flange; an outer casing adapted to telescope over and to extend beyond said inner casing; a rod adapted to connect with a vehicle spring slidable through said extended bearing; and a rigid connection between said rod and said outer casing, substantially as described.

6. In a shock absorber the combination of a bracket provided with an extended sleeve having a lining to constitute an extended bearing, with a shoulder, and with a reduced lower portion having means for attachment to the axle of a vehicle; an inner casing provided with an inwardly extending flange adapted to rest on said shoulder; a cushioning spring adapted to rest on said flange; an outer casing provided with an inwardly extending flange, having an opening adapted to telescope over and to extend beyond said inner casing; a rod adapted to connect with a vehicle spring slidable through said extended bearing and provided with an extension located in said opening; and a detachable connection between said rod and said second named flange, substantially as described.

In testimony whereof I affix my signature, in presence of two witnesses.

FELIX HENRI PETITMAIRE.

Witnesses:
H. LAZZARO,
EMILE LÉFORE.